June 14, 1960 W. A. CRANE 2,940,595
DUAL MANIFOLD FILTER AND CONTROL SYSTEM
Filed Feb. 17, 1958
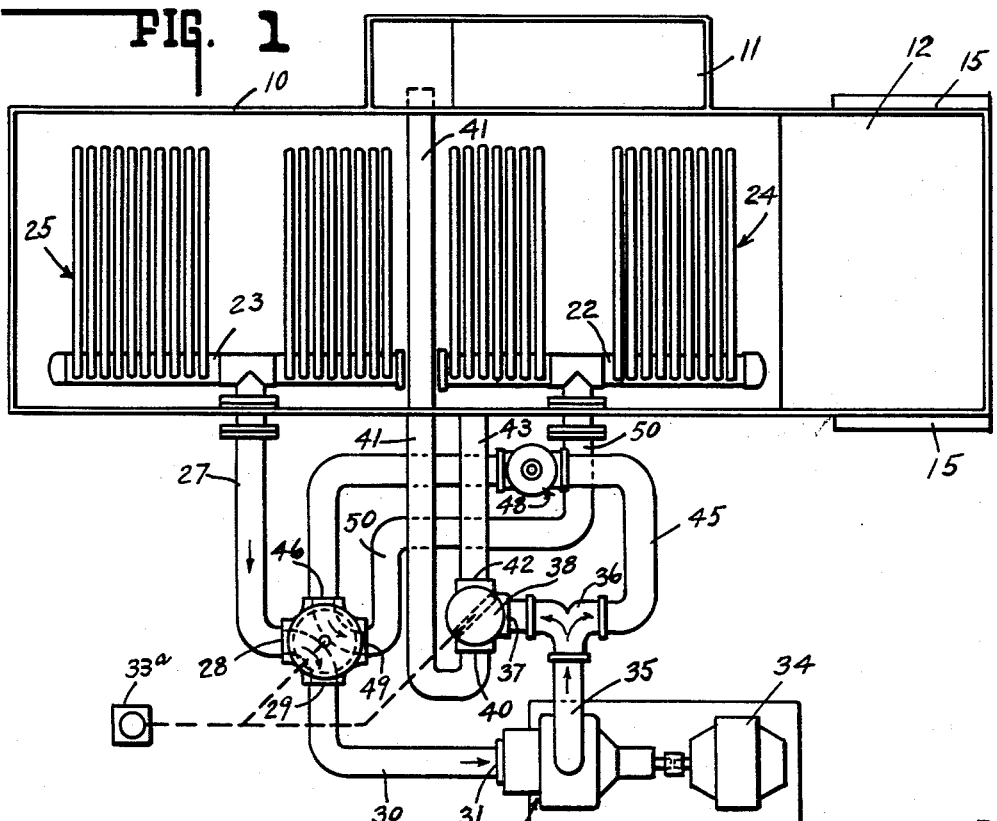
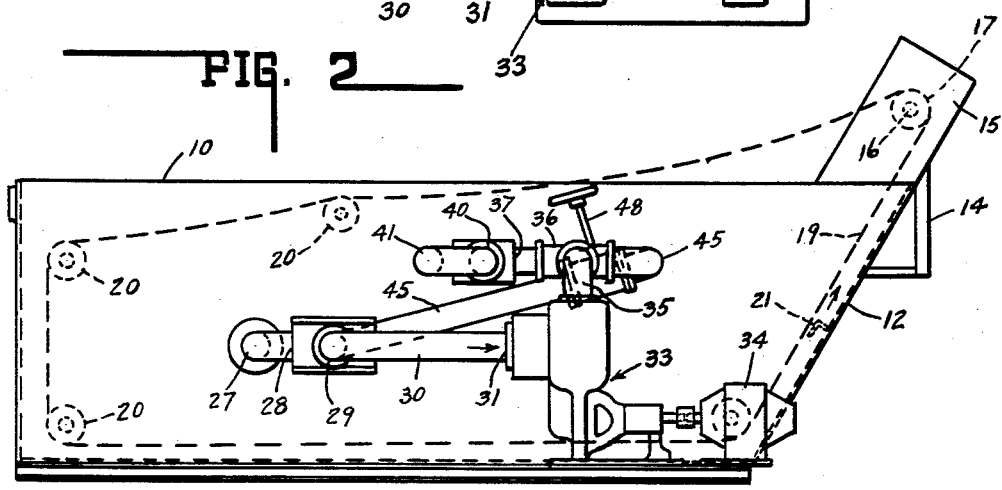
INVENTOR.
WILLIAM A. CRANE.
BY
Lockwood, Galt, Woodard & Smith
ATTORNEYS.

United States Patent Office 2,940,595
Patented June 14, 1960

2,940,595

DUAL MANIFOLD FILTER AND CONTROL SYSTEM

William A. Crane, Lebanon, Ind., assignor, by mesne assignments, to Indiana Commercial Filters Corporation, Lebanon, Ind., a corporation of Indiana Filed Feb. 17, 1958, Ser. No. 715,576

3 Claims. (Cl. 210—333)

This invention relates generally to filtering apparatus and in particular to a fluid filtering apparatus which is self-cleaning, the filtering operation and the filter cleaning operation being carried on simultaneously. The invention disclosed herein is an improvement over that disclosed in the copending application of John R. Mummert, for Dual Manifold Filter, filed Feb. 17, 1958, Serial No. 715,656, and assigned to the assignee of this application.

In the filtration of coolant fluids, cutting oils or other liquids requiring removing therefrom of minute particles, various means have been devised for cleaning the filters after they have become caked with particles filtered from the fluid. Various arrangements for backwashing the fouled filters have been used, these usually requiring shutdown of the filtering operation while backwashing takes place. Further, these attempts at solution of the problem have usually involved the diversion of the backwashing fluid to a drain where it is lost rather than being recovered by return of the backwashing fluid back to the reservoir of unfiltered liquid. Also conventional filtering systems do not include any means of removing particles from the fluid which collect on the inside surfaces of the filters during backwashing. Consequently the fluid contains a certain amount of particles when the filtering process is reversed from backwashing to filtering. Thus the fluid is not entirely clean until after fluid flows in a filtering direction for a certain period of time.

The present invention provides a filtering arrangement similar to that provided in said copending application wherein a single filtering tank includes two headers each having a plurality of tubular screen filter units connected thereto. One of the headers is connected to the suction side of a liquid pump through one section of a four-way valve. The flow from the pump is divided and proportioned so that part of the discharge of the pump is returned to the other header, cleaning its attached filter units by backwashing with the remainder of the flow of filter fluid being directed through the filtered liquid delivery line. A time controlled actuating means may be used to change, at intervals, the position of the four-way valve to reverse the flow through the filters. Thus, one bank of filter units is undergoing backwashing while the other bank of filter units filters the liquid flow to the pump. The cleaning and filtering processes are continuous with the two banks of filter units alternately performing these functions.

In accordance with the present invention, a three-way valve is connected in the liquid line delivering filtered fluid, the valve having a port communicating with the filter tank, which serves as a reservoir for unfiltered fluid. Any solids which have accumulated inside the appropriate filter bank during the preceding backwashing cycle will thus be directed into the filter tank rather than into the filtered fluid.

The principal object of this invention, therefore, is to provide a filtering apparatus in which a plurality of banks of filtering units are controlled so as to provide a fluid filtering action in one bank of filters and to simultaneously provide a filter backwashing action within one or more of the other banks of filters, and to provide means for diverting the initial delivery of filtered fluid from each backwashed bank of filters back to the reservoir of unfiltered fluid, thereby insuring that particles accumulated within the backwashed filters during the preceding backwashing cycle are not delivered with the filtered fluid.

The full nature of the invention will be understood from the accompanying drawings and the following description and claims.

Fig. 1 is a top plan view, in schematic form with parts omitted, illustrating the present invention.

Fig. 2 is a side view of the apparatus shown in Fig. 1 and showing a tank cleaning apparatus.

Referring to Figs. 1 and 2, a filter tank 10 provides a reservoir of unfiltered fluid and on one side supports a filtered fluid tank 11 which provide a reservoir of filtered fluid for delivery to a desired location such as to the cutting fluid circulating system of a machine tool. For purposes of clarity the liquid lines and valves in Fig. 1 are shown schematically therein. Fig. 2 more clearly discloses the actual disposition of the components.

As shown in Fig. 2, the tank 10 is provided with an inclined end wall 12 terminating in a discharge chute 14. Members 15 extending from each side of the filter tank support a transverse shaft 16 which may be rotated by a suitable electric motor (not shown). The shaft rotates sprockets 17 positioned adjacent each of the members 15, and each of the sprockets accommodates an endless chain shown schematically at 19. Idler sprockets 20 disposed, as shown in Fig. 2, within the tank, guide the chain in its excursion along the base of the tank and up its inclined side wall. The chain has placed thereon a plurality of transverse scraping elements, one of which is shown at 21 in Fig. 2. It will be evident that as the chain moves across the base of the filter tank and up its inclined side, the scraping elements will dislodge any sludge accumulated in the tank and will convey it to the discharge chute 14, thereby ejecting it from the tank.

Referring again to Fig. 1, mounted within the filter tank are manifolds 22 and 23, each of which communicates with the interior of a series of filter elements forming filter banks 24 and 25, respectively. The filter elements may be of any suitable type, but are here shown as of the tubular screen type enclosed by a fabric bag.

The manifold 23 is connected by means of a line 27 to a port 28 of a conventional four-way valve set as shown, the port 28 communicates with a port 29 which, by means of line 30, is connected to the suction side 31 of a liquid pump 33 driven by a motor 34. The discharge side of the pump is connected to a line 35 which, in turn, communicates with a T-fitting 36. One side of the fitting communicates with a port 37 of a three-way valve 38. With the three-way valve in the position shown in Fig. 1, the port 37 communicates with the port 40 which is connected to a line 41. The line 41 extends transversely through the filter tank and discharges into the filtered fluid reservoir 11.

A further port 42 of the three-way valve is connected to a line 43 which discharges into the unfiltered fluid reservoir provided by the tank 10. The fitting 36 is further conected to a backwash line 45 which, in turn, is connected to a port 46 of the four-way valve. A manually adjustable flow restricting valve 48 is interposed in the backwash line 45 and provides a means for adjustably regulating the flow of liquid therethrough. With the four-way valve in the position shown in Fig. 1, the port 46 communicates with a port 49 which is connected to a line 50 communicating with the interior of the manifold 22.

In operation, with the four-way valve and the three-way valve in their positions of Fig. 1, the pump will draw fluid through the filter bank 25 and the filtered fluid will flow through the line 27, ports 28 and 29, and through line 30 to the pump. The discharge line 35 of the pump will deliver fluid to the fitting 36 where a portion of the filtered fluid will be directed to the port 37 and the remaining portion will be diverted to the backwash line 45. The filtered fluid delivered to the port 37 will flow through the three-way valve, port 40, and by means of delivery line 41 will be deposited in the filtered fluid reservoir provided by the tank 11.

The portion of the filtered fluid diverted to the backwash line 45 will flow at a rate controlled by valve 48 through the ports 46 and 49 of the four-way valve and, by means of line 50, will be delivered to the interior of the manifold 22. This fluid will thus flow outwardly from the elements of the filter bank 24 and will be discharged into the reservoir of unfiltered fluid and during its passage reversely through the filter elements will backwash them, removing from their outer surfaces any accumulated residue from previous filtering cycles.

When the four-way valve is shifted 90° from its position of Fig. 1, the three-way valve is also shifted by the time-controlled actuating means 33a so that the port 40 is blocked and the ports 37 and 42 are placed in communication with each other. The time-controlled actuating means is arranged so that the three-way valve is maintained in its alternate position for only the initial portion of the cycling period of the four-way valve and is then returned to its position of Fig. 1. With each shift in position of the four-way valve the three-way valve thus serves to divert the initial flow of filtered fluid from the port 37 into the reservoir of unfiltered fluid by means of the line 43. The initial flow of filtered fluid through either of the filter banks is thus returned to the unfiltered fluid reservoir.

This action of the three-way valve insures that any solids or other residue which may have accumulated on the interior surfaces of the filter elements during a previous backwashing cycle will not be delivered to the filtered fluid reservoir but will be returned to the filter tank 10. After the filtered fluid has thus been freed of any deposit accumulated during the preceding backwashing cycle, the three-way valve is returned to its position of Fig. 1 and, depending upon the position of the four-way valve, fluid filtered by the appropriate one of the filter banks will be thereafter delivered through line 41 to the filtered fluid reservoir. As preveiously mentioned, the valve 48 may be manually adjusted to provide the desired backwash rate of flow.

The present invention provides a three-way valve by means of which the initial flow of filtered fluid is retured to the reservoir of unfiltered fluid to prevent any residue, accumulated in the filter elements during the preceding backwashing cycle, from being delivered to the reservoir of filtered fluid, and insures a source of filtered fluid at all times.

I claim:

1. A liquid filtering apparatus including in combination, a filter tank providing a reservoir of unfiltered liquid, dual filter units within said tank, a fluid pump, a discharge line for said pump adapted to deliver filtered liquid, a backwash line communicating with said discharge line, means including a four-way valve adapted in one position to connect one of said filter units to the suction line of said pump and the other of said filter units to said backwash line, and in another position to reverse the connections of said filter units, control means for periodically operating said four-way valve between one or the other of its said positions, whereby upon operation of said pump liquid is alternately filtered through one of said filter units as the other filter unit is backwashed with the backwash liquid being returned to said filter tank, a filtered liquid tank, a three-way valve having a first port connected in said discharge line downstream of the point of connection of said backwash line thereto, means connecting a second port of said three-way valve to said filtered fluid tank, means further connecting a third port of said three-way valve to said unfiltered liquid tank, said three-way valve being thereby adapted in one position to permit delivery of filtered fluid from said discharge line to said filtered liquid tank and in another position to divert filtered fluid into said unfiltered liquid tank, and further control means for operating said three-way valve to said other position for a predetermined interval upon each operation of said four-way valve, whereby filtered fluid is initially returned to said unfiltered liquid tank upon each operation of said four-way valve.

2. A liquid filtering apparatus including in combination, a filter tank providing a reservoir of unfiltered liquid, a plurality of filter units within said tank, a fluid pump, a discharge line for said pump adapted to deliver filtered liquid, a backwash line communicating with said discharge line, means including a four-way valve adapted in one position to connect one of said filter units to the suction line of said pump and another of said filter units to said backwash line, and in another position to reverse the connections of said filter units, said four-way valve being adapted to be intermittently operated between one or the other of its said positions, whereby upon operation of said pump liquid is alternately filtered through the said one of said filter units as the said other filter unit is backwashed with the backwash liquid being returned to said filter tank, a filtered liquid tank, a three-way valve having a first port connected in said discharge line downstream of the point of connection of said backwash line thereto, means connecting a second port of said three-way valve to said filtered liquid tank, means further connecting a third port of said three-way valve to said unfiltered liquid tank, said three-way valve being thereby adapted in one position to permit delivery of filtered fluid from said discharge line to said filtered liquid tank and in another position to divert filtered fluid into said unfiltered liquid tank, and means for operating said three-way valve to said other position for a predetermined interval upon each operation of said four-way valve, whereby filtered fluid is initially returned to said unfiltered liquid tank upon each operation of said four-way valve.

3. A liquid filtering apparatus including in combination, a filter tank providing a reservoir of unfiltered liquid, a plurality of filter units within said tank, a fluid pump, a discharge line for said pump adapted to deliver filtered liquid, a backwash line communicating with said discharge line, first valve means operable in one position to connect one of said filter units to the suction line of said pump and another of said filter units to said backwash line, and in another position to reverse the connections of said filter units, said valve means being intermittently operable between one or the other of its said positions, whereby upon operation of said pump liquid is alternately filtered through the said one of said filter units as the said other filter unit is backwashed with the backwash liquid being returned to said filter tank, a second valve means having a fluid delivery port and a port connected in said discharge line downstream of the point of connection of said backwash line thereto, and means further connecting said second valve means to said unfiltered liquid tank, said second valve means being thereby operable in one position to permit delivery of filtered fluid from said discharge line and in another position to divert filtered fluid into said unfiltered liquid tank.

References Cited in the file of this patent

UNITED STATES PATENTS

| | | |
|---|---|---|
| 713,717 | Thompson | Nov. 18, 1902 |
| 1,001,027 | Hauer | Aug. 22, 1911 |